(12) United States Patent
Bozionek et al.

(10) Patent No.: US 8,060,111 B2
(45) Date of Patent: Nov. 15, 2011

(54) METHOD FOR DETERMINATION OF LOCATION INFORMATION IN A COMMUNICATION SYSTEM

(75) Inventors: Bruno Bozionek, Borchen (DE); Dieter Klaus, Delbrück (DE); Hubert Niemeier, Paderborn (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 430 days.

(21) Appl. No.: 12/226,629

(22) PCT Filed: Jan. 30, 2007

(86) PCT No.: PCT/EP2007/050866
§ 371 (c)(1),
(2), (4) Date: Oct. 23, 2008

(87) PCT Pub. No.: WO2007/124964
PCT Pub. Date: Nov. 8, 2007

(65) Prior Publication Data
US 2009/0069030 A1 Mar. 12, 2009

(30) Foreign Application Priority Data
Apr. 27, 2006 (EP) .................................. 06008846

(51) Int. Cl.
*H04W 24/00* (2009.01)
(52) U.S. Cl. .................. 455/456.1; 455/456.6
(58) Field of Classification Search ............... 455/404.2, 455/456.1–457, 517, 566, 41.2, 41.3, 440, 455/441; 701/200, 201, 206–208, 213; 340/988, 340/990, 993, 995.1, 995.19, 995.24; 370/328, 370/332, 338, 400, 401, 908
See application file for complete search history.

(56) References Cited

U.S. PATENT DOCUMENTS

| | | | |
|---|---|---|---|
| 7,123,925 B2* | 10/2006 | Robinson et al. | 455/456.1 |
| 7,139,820 B1* | 11/2006 | O'Toole et al. | 709/223 |
| 7,194,273 B2* | 3/2007 | Vaudreuil | 455/456.3 |
| 7,483,705 B2* | 1/2009 | A'Rafat et al. | 455/456.1 |
| 2002/0143769 A1* | 10/2002 | Tecu et al. | 707/10 |
| 2006/0148488 A1* | 7/2006 | Syrbe | 455/456.1 |

FOREIGN PATENT DOCUMENTS

| | | |
|---|---|---|
| EP | 1 146 699 A2 | 10/2001 |
| WO | WO 2005/033828 A2 | 4/2005 |
| WO | WO 2005/103624 A2 | 11/2005 |

* cited by examiner

*Primary Examiner* — Anthony Addy

(57) ABSTRACT

A method for computer-aided operation of a communication system with a communication network, which has a plurality of network nodes, which are designed to interchange data with a number of terminals in the communication system, and in which the following steps are carried out: the terminals determine a first position variable relating to or at a specific point, with the first position variable comprising a semantic description relating to that specific point; the terminals determine a second position variable relating to or at the specific point with the second position variable comprising physical location information relating to that specific point; the first and the second position variables which have been determined by one of the terminals together represent location information, with the location information being transmitted to a network node in the communication network for further processing.

19 Claims, 1 Drawing Sheet

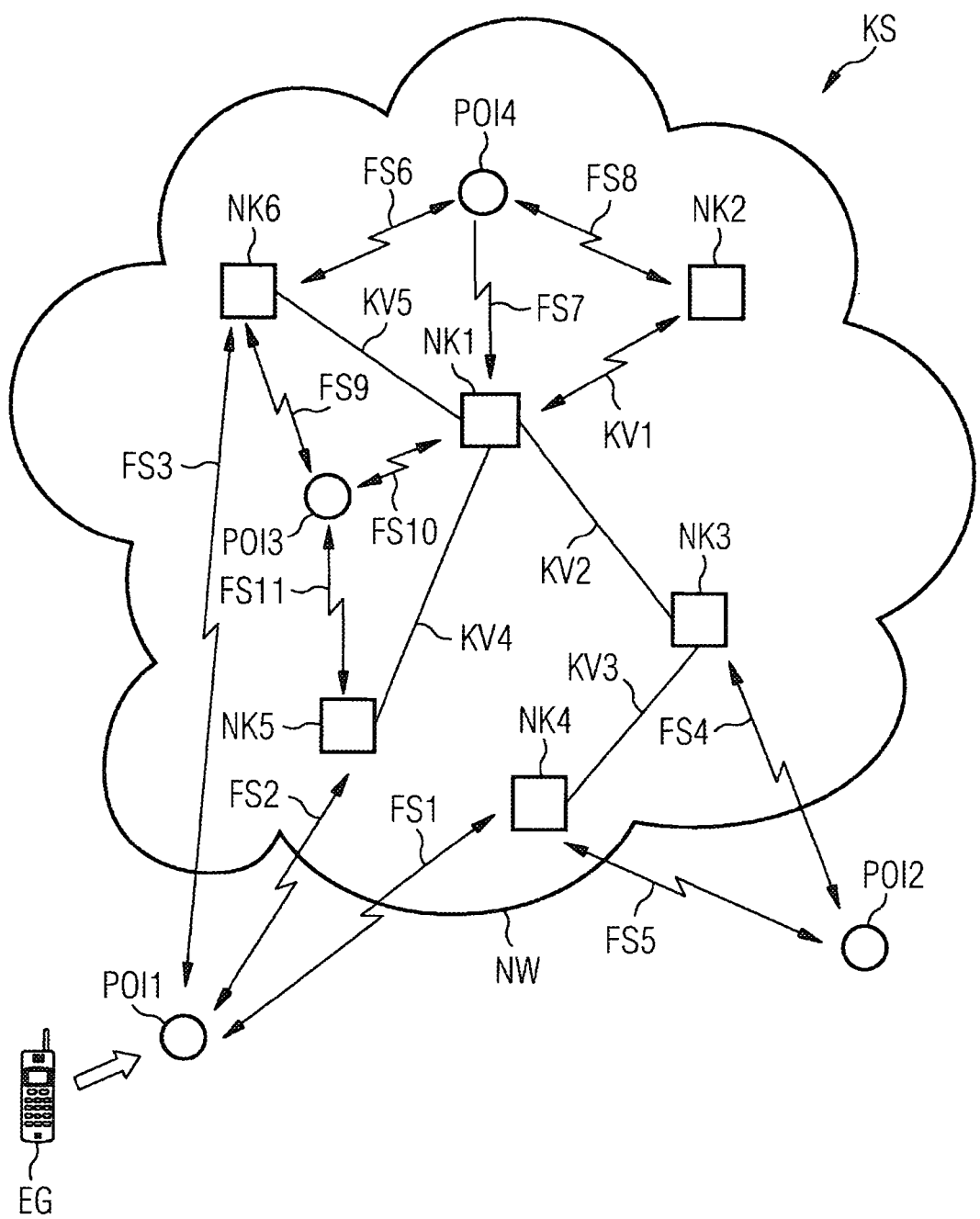

METHOD FOR DETERMINATION OF LOCATION INFORMATION IN A COMMUNICATION SYSTEM

CROSS REFERENCE TO RELATED APPLICATIONS

This application is the US National Stage of International Application No. PCT/EP2007/050866, filed Jan. 30, 2007 and claims the benefit thereof. The International Application claims the benefits of European application No. 06008846.5 EP filed Apr. 27, 2006. Both of the applications are incorporated by reference herein in their entirety.

FIELD OF INVENTION

The invention relates to a method for computer-aided operation of a communication system with a communication network which has a plurality of network nodes which are designed to interchange data with a number of terminals in the communication system. The invention further relates to a method for computer-aided operation of a terminal in a communication system with a communication network and to a method for computer-aided operation of a communication network. The invention further relates to a communication network and a terminal for implementing the method.

BACKGROUND OF INVENTION

Communication networks are known in a multitude of types. Thus a communication network that is distributed in a building and possibly across a site may be operated solely by a private operator and used only by terminals that are allocated to or authorized by the private operator. Such a communication network could, for example, be a corporate in-house communication network, which facilitates communication in the buildings and site of the company. A communication network of this type is frequently also referred to as an enterprise network.

A great many locations of interest, otherwise known as Points of Interest (PoI), may be defined in the area covered by the communication network. PoIs are known in the context of navigation systems and route planners. PoIs are locations that may be of interest for the user of a map or navigation system, such as—for example—restaurants, cash machines or filling stations. In the specific case of the area covered by the communication network, PoIs are—for example—conference rooms, workplaces, libraries, elevator accesses, etc. The PoIs may be shown on or inserted in a map as symbols. It is known, for example, for navigation systems to provide visual and audible indications of PoIs as soon as the user approaches them. Further additional information might also be stored for PoIs, such as—for example—opening times, telephone numbers, etc.

Terminals that have been set up for communication with the network nodes of the communication network have a wireless communication interface, e.g. WLAN (Wireless Area Network), DECT (Digital Enhanced Cordless Telecommunications), Bluetooth, or GSM (Global System for Mobile Communications) etc., which facilitates data interchange with the network nodes of the communication network.

The terminal or an infrastructure communicating with the terminal, e.g. the communication network, is able to determine the current position on the basis of wireless communication technology. The position may be stored in any defined system of coordinates. Thus it is now possible for any PoI to be assigned a position and for the physical coordinates to be stored in the defined coordinates system in a database that can be accessed through the communication network.

The current location may be determined by known methods of triangulation, e.g. by a plurality of network nodes in the communication network, or the degrees of latitude and longitude may be determined by means of GPS or Galileo. It is also known for a position to be determined on the basis of radio field conditions, in which the field strength of a number of network nodes of the communication network that are communicating on a wireless basis is determined.

By continuously determining the current position of the terminal, e.g. in the form of coordinates, and exchanging these coordinates with the communication network, it is possible to detect proximity to a PoI. In order to facilitate this functionality, therefore, it is necessary—in the local area covered by the communication network—to carry out measurements for each PoI, to assign the measured physical location coordinates to the defined coordinates system, and to store the data thus obtained in the database.

The disadvantage of this is the great expense of having to carry out measurements for each PoI, particularly if the communication network extends over a large area. Further problems are caused by the fact that changes in the spatial conditions may lead to changed measurement values relating to the current position of the terminal at a PoI. Such changes in the spatial conditions might, for example, be caused by furnishings being repositioned within a building, or by walls being relocated or—in particular—by walls being added.

SUMMARY OF INVENTION

An object of this invention is to provide a method for computer-aided operation of a communication system with a communication network and with a number of terminals and methods for operation of the communication network and terminal, which does not have the disadvantages described in the prior art. A further object of this invention is to provide a communication network and a terminal which are designed for implementation of the inventive method.

These objects are achieved with the features of the independent claims. Advantageous embodiments, however, emerge from the dependent claims.

An inventive method for computer-aided operation of a communication system with a communication network, which has a plurality of network nodes which are designed to interchange data with a number of terminals in the communication system, comprises the following stages: the terminals determine a first position variable relating to or at a specific point, with the first position variable comprising a semantic description relating to that specific point. The terminals determine a second position variable relating to or at the specific point, with the second position variable comprising physical location information relating to that specific point. The first and the second position variables which have been determined by one of the terminals together represent location information, with the location information being transmitted to a network node of the communication network for further processing.

The inventive method dispenses with the need to carry out prior measurements with regard to physical coordinates for the Points of Interest referred to as specific points. Instead, the information necessary for a specific point—i.e. the physical coordinates—is determined by the terminals themselves. In order to be able to assign the physical coordinates to the specific point, the method provides for a semantic description of the specific point to be determined in the form of the first position variable, in addition to the physical location information. On the basis of the first and second position variable showing location information, it is possible—if there is a lot of location information from a large number of terminals or measurements—for the physical location of any specific point to be determined easily and with a high degree of reliability.

In particular, this enables changes that arise during operation of the communication system to be identified, whereby—for example—second position variables with different physical location information are determined in relation to a specific point, to which a specific semantic description is assigned as the first position variable. The inventive method thus provides a self-learning mechanism so that administrative measurements do not need to be carried out by an administrator of the communication network.

In one embodiment of the invention the network node analyzes the location information received from the number of terminals and determines, for each first position variable, an assigned third position variable from the second position variable, with the third position variable comprising physical location information relating to the specific point characterized by the first position variable. For the purpose of determining the third position variable, it is preferable for a large number of second position variables to be consulted and analyzed—particularly in statistical terms. In other words, this method determines the physical location information for a semantic description relating to any specific point, e.g. in the form of coordinates in any defined coordinates system. The physical location information is determined from the analysis of many items of physical location information transmitted in relation to the specific point. In this way physical location information, which is actual or highly probable at the given point in time, can be determined for any specific point with a high degree of reliability. This information is stored in the third position variable. The content of this third position variable may correspond to that of the second position variable. However, the third position variable for a specific point may also deviate from the second position variable(s) for the specific point, e.g. if the physical location of the specific point has actually changed.

According to a further embodiment of the inventive method, the first position variable and the third position variable are stored by the network node for each specific point as location information. The network node may, for example, be a central processor of the communication network, which is connected to a memory for holding a database. Storage of the first and the third position variable for a specific point is sufficient, since the third position variable incorporates the physical location information determined from permanent analysis of a multitude of second position variables for the specific point. If any changes to the physical location information for the specific point are to be taken into account, storing the second position variable for the specific point in addition might also be considered.

In a further embodiment, the third position variable is provided to the network node of the communication network and/or the terminal for further processing, in particular for detection of the specific point. This enables the currently valid physical location information to be provided to the terminals in relation to any specific point in the form of the third position variable, e.g. in order to find the specific points. This ensures a greater degree of accuracy during operation of the communication system.

The first position variable is determined by monitoring an activation of an input medium of the terminal. The semantic information, which is processed further as the first position variable, is entered by the user of the terminal. In order to do this, the user is preferably offered a list of options to avoid differences in the semantic description of a specific point.

The second position variable, i.e. the physical location information relating to or at the specific point, is determined by the terminal using one or more of the following methods: triangulation methods, which are carried out using the network nodes of the communication network, might be considered. Triangulation methods may also be used in combination with a GPS (Global Positioning System) or a Galileo system. A further option for defining the data of the second position variable at the specific point consists in determining the radio field conditions, whereby the field strengths of at least some of the network nodes of the communication network that are communicating on a wireless basis are determined. In this variant the specific point is characterized by a plurality of field strengths of different network nodes of the communication network.

In a method for the computer-aided operation of a terminal in a communication system with a communication network, which has a plurality of network nodes which are designed to interchange data with the terminal, the following steps are carried out: the terminal determines a first position variable relating to or at a specific point, with the first position variable comprising a semantic description relating to that specific point. The terminal determines a second position variable relating to or at the specific point, with the second position variable comprising physical location information relating to that specific point. The first and the second position variables which have been determined by the terminal together represent location information, with the location information being transmitted to a network node of the communication network.

In a development the terminal receives a third position variable, which is assigned to the specific point and which exchanges the second position variable contained in the location information through the third position variable, with the third position variable comprising physical location information relating to the specific point characterized by the first position variable and being determined by the communication system.

In an inventive method for the computer-aided operation of a communication network, which has a plurality of network nodes which are designed to interchange data with a number of terminals of a communication system, the following steps are carried out: location information which includes a first and a second position variable for a specific point is received from the number of terminals, with the first position variable comprising a semantic description relating to that specific point and with the second position variable comprising physical location information relating to that specific point. The network node analyzes the location information received from the number of terminals and determines, for each first position variable, an assigned third position variable from the second position variable, with the third position variable comprising physical location information relating to the specific point characterized by the first position variable.

In a development, a large number of second position variables are consulted and analyzed—particularly in statistical terms—in order to determine the third position variable.

In a development, the first position variable and the third position variable are stored by the network node as location information for each specific point.

In a development the third position variable is provided to the network nodes of the communication network and/or to the terminals for further processing, in particular for detection of the specific point.

These methods are associated with the same advantages as have been explained in connection with the inventive communication system.

The invention further comprises a communication network, which has a plurality of network nodes which are designed to interchange data with a number of terminals of a communication system and which have the means for implementing the method described above. In particular, the communication network is designed as an enterprise network.

The invention further comprises a terminal for a communication system with a communication network, which has a plurality of network nodes which are designed to interchange data with the terminal, this being the means for implementing the method described above.

BRIEF DESCRIPTION OF THE DRAWING

The invention is described in greater detail below on the basis of an exemplary embodiment shown in a sole FIGURE.

DETAILED DESCRIPTION OF INVENTION

The single diagram shows an inventive communication system KS, which comprises a communication network NW with a large number of network nodes NK1, NK2, NK3, NK4, NK5, NK6. The network nodes NK1, NK2, NK3, NK4, NK5, NK6 are connected via communication connections KV1, KV2, KV3, KV4, KV5 for the purpose of exchanging data with one another, with the communication connection KV1—for example—being wireless, and the remaining communication connections KV2, KV3, KV4, KV5—for example—being wired. The network nodes NK1, NK2, NK3, NK4, NK5, NK6 may be interconnected in any way via communication connections. Furthermore, the network nodes NK1, NK2, NK3, NK4, NK5, NK6 have a communication interface of contactless design for communication with terminals EG, with only a single terminal EG being shown in the diagram by way of example.

The communication network NW, for example, represents a so-called enterprise network, which is not available for public communication but is used instead in the sphere of influence e.g. of a company. The communication network NW may extend across one or more buildings and the corresponding real estate. So-called Points of Interest PoI1, PoI2, PoI3 and PoI4, are defined within the local area covered by the communication network. These points, referred to as Points of Interest, may—for example—represent a specific workplace, a conference room, an entrance, or an elevator access, etc. Each of the specific points PoI1, PoI2, PoI3 and PoI4 is characterized by physical location information, e.g. coordinates in a self-defined system of coordinates, geographical degrees of latitude and longitude, or similar. In addition, each of the specific points PoI1, PoI2, PoI3 and PoI4 may be assigned a semantic description ("Workplace", "Conference Room 1", "Entrance 4", "Elevator Access 8").

The invention now facilitates the automatic detection and provision of location information in the communication network NW, wherein the method permits a self-learning description of the specific points. If, for example, the terminal is located at the specific point PoI1, then the semantic description of the specific point PoI1 entered by the user of the terminal is recorded by the terminal. The semantic description may be entered by the user freely inputting the description. It is preferable for a list with descriptive content to be provided so that the user of the terminal EG can select a semantic description that characterizes the specific point PoI1.

At the same time physical location information, e.g. degrees of latitude and longitude or radio field conditions for one or more of the network nodes NK1, NK2, NK3, NK4, NK5, NK6, is determined by the terminal EG. In the exemplary embodiment, radio connections to the network nodes NK4, NK5 and NK6 exist at the specific point PoI1, so that the respective field strengths FS1, FS2, FS3 are present at the specific point PoI1. The semantic description and the physical location information together form location information which is transmitted from the terminal EG to one of the network nodes NK4, NK5, NK6 of the communication network NK.

During operation of the inventive communication networks NW a large number of terminals EG transfer such location information to the communication network NW in relation to each specific point PoI1, PoI2, PoI3, PoI4.

A selected processor of the communication network, e.g. a server, stores the location information sent to it in relation to all specific points PoI1, PoI2, PoI3 and PoI4. An analysis is carried out to the effect that all physical location information is statistically analyzed for a specific point (i.e. a specific semantic description). This produces a further position variable, whose physical location information is assigned to the semantic description of the specific point.

If deviations occur in the field strengths at a specific point, e.g. as a result of structural modifications in a building, then this is registered by the communication network on the basis of changed physical location information which is assigned to this specific point. During the analysis the communication network or the network node performing the analysis detects that the physical location information for the specific point has changed. This change is registered by the communication network NW or by the network node performing the analysis. The actual, physical location information may, furthermore, be provided to the network nodes of the communication network or to applications running on it, and/or to the terminals EG in data exchange with the network node, for further processing. The terminals EG may consult this information e.g. for navigating within the enterprise network.

This results in a continuous improvement process, in which the location information for a specific point is continuously updated and improved. The self-learning effect is achieved in that, when the current location information determined by the terminals is received, any deviation from the current value is detected by the network nodes of the communication network that carry out the analysis, and—from the frequency of these occurring changes—it is concluded that, for example, the radio field conditions at the specific point have changed. Thus the location information for the specific point is updated in a database of the communication network in the described manner.

The invention claimed is:

1. A method for a computer-aided operation of a communication network, comprising:

a plurality of terminals determining a plurality of first position variables relating to a specific point, each one of the first position variables comprising a description of the specific point;

the plurality of terminals determining a plurality of second position variables relating to the specific point, each one of the second position variables comprising physical location information of each of the plurality of terminals in proximity to the specific point;

the plurality of terminals transmitting the plurality of first position variables and the plurality of second position variables to a communication network;

the communication network storing the plurality of first position variables and the plurality of second position variables as a plurality of items of location information in a database, each item of location information comprising the first position variable and the corresponding second position variable that were transmitted by a respective one of the plurality of terminals;

the communication network statistically analyzing the plurality of items of location information to produce a third position variable, the third position variable comprising statistically analyzed physical location data of the specific point;

the communication network assigning the third position variable to the description of the specific point;

the communication network providing the third position variable to at least one terminal of the plurality of terminals;

the plurality of terminals transmitting the plurality of first position variables and a plurality of updated second position variables to the communication network, the plurality of updated second position variables are different from the plurality of second position variables in the stored items of location information;

the communication network storing the plurality of first position variables and the plurality of updated second position variables as a plurality of updated items of location information in the database, each updated item of location information comprising a first position variable and a corresponding updated second position variable that were transmitted by a respective one of the plurality of terminals;

the communication network statistically analyzing the plurality of updated items of location information to produce an updated third position variable, the updated third position variable comprising statistically analyzed physical location data of the specific point;

the communication network assigning the updated third position variable to the description of the specific point; and the communication network providing the updated third position variable to the at least one terminal of the plurality of terminals that received the third position variable.

2. The method of claim 1, wherein the second position variables comprise coordinates in a self-defined system of coordinates.

3. The method of claim 1 wherein the communications network comprises at least one of a plurality of network nodes and a server.

4. The method of claim 3 further comprising at least one network node of the plurality of network nodes analyzing a plurality of items of location information that have a different second position variable than a previously stored item of location information, and the at least one network node updating the third position variable.

5. The method of claim 4 further comprising the at least one network node providing the updated third position variable to the plurality of network nodes.

6. The method of claim 1 further comprising offering a user of at least one first terminal of the plurality of terminals a list of predetermined names for the specific point.

7. The method of claim 1 wherein the plurality of terminals determining a plurality of second position variables relating to the specific point comprises using a determination method selected from the group consisting of triangulating a position of each of the plurality of terminals, determining a radio field strength measurement of the communication network at a location for each of the plurality of terminals, and using a Global Positing System ("GPS") to determine the location for each of the plurality of terminals.

8. The method of claim 1, wherein the communication network is an enterprise network.

9. The method of claim 1 wherein the plurality of terminals determining the plurality of first position variables comprises monitoring an activation of an input medium of each of the plurality of terminals.

10. The method of claim 9 further comprising offering a user of each terminal a list of predetermined descriptions for the specific point.

11. The method of claim 1 further comprising the at least one terminal of the plurality of terminals consulting the updated third position variable for navigation purposes.

12. A system for computer-aided operation of a communication network, comprising:

a communication network having a plurality of network nodes; and a plurality of terminals connected to the communication network; and wherein each of the plurality of terminals determines a plurality of first position variables relating to a specific point, each of the first position variables comprising a name of the specific point; and wherein each of the plurality of terminals determines a plurality of second position variables relating to the specific point, each of the second position variables comprising physical location information of each of the plurality of terminals in proximity to the specific point; and wherein the plurality of terminals transmit the plurality of first position variables and the plurality of second position variables to the plurality of network nodes of the communication network; and wherein the communication network stores the plurality of first position variables and the plurality of second position variables as a plurality of items of location information in a database, each item of location information comprising a first position variable and a second position variable that were transmitted together by a respective one of the plurality of terminals; and wherein the communication network statistically analyzes the plurality of items of location information to produce a third position variable, the third position variable comprising statistically analyzed physical location data of the specific point; and wherein the communication network assigns the third position variable to the name of the specific point and provides the third position variable to at least one terminal of the plurality of terminals; and the plurality of terminals transmitting the plurality of first position variables and a plurality of updated second position variables to the communication network, the plurality of updated second position variables are different from the plurality of second position variables in the stored items of location information;

the communication network storing the plurality of first position variables and the plurality of updated second position variables as a plurality of updated items of location information in the database, each updated item of location information comprising a first position variable and a corresponding updated second position variable that were transmitted by a respective one of the plurality of terminals;

the communication network statistically analyzing the plurality of updated items of location information to produce an updated third position variable, the updated third position variable comprising statistically analyzed physical location data of the specific point;

the communication network assigning the updated third position variable to the name of the specific point; and the communication network providing the updated third position variable to the at least one terminal of the plurality of terminals that received the third position variable.

13. The system of claim 12 wherein the at least one terminal of the plurality of terminals that received the third position variable consults the third position variable for navigation purposes.

14. The system of claim 12 wherein the communication network analyzes a plurality of items of location information that have a different second position variable than previously stored items of location information and the communication network updates the third position variable.

15. The system of claim 14 wherein the communication network assigns the updated third position variable to the name of the specific point and the communication network provides the updated third position variable to the at least one terminal of the plurality of terminals that received the third position variable.

16. The system of claim 12 wherein at least one first terminal of the plurality of terminals offers a user of the at least one first terminal a list of predetermined names for the specific point.

17. The system of claim 12 wherein the communications network comprises at least one of a plurality of network nodes and a server.

18. The system of claim 17 wherein at least one network node of the plurality of network nodes analyzing a plurality of items of location information that have a different second position variable than a previously stored item of location information, and the at least one network node updating the third position variable.

19. The system of claim 18 wherein the at least one network node providing the updated third position variable to the plurality of network nodes.

\* \* \* \* \*